United States Patent [19]
Lumsden et al.

[11] 4,244,929
[45] Jan. 13, 1981

[54] RECOVERY OF CHLORINE VALUES

[75] Inventors: John Lumsden, Avonmouth; Charles E. E. Shackleton, London, both of England

[73] Assignee: Mineral Process Licensing Corporation BV, The Hague, Netherlands

[21] Appl. No.: 39,293

[22] Filed: May 15, 1979

[30] Foreign Application Priority Data

May 16, 1978 [GB] United Kingdom ............... 19986/78

[51] Int. Cl.³ ............................................. C01G 49/10
[52] U.S. Cl. ..................................... 423/149; 423/493; 423/633; 423/148
[58] Field of Search ........................ 423/148, 149, 493

[56] References Cited

U.S. PATENT DOCUMENTS

| | | | |
|---|---|---|---|
| 3,067,005 | 12/1962 | Nelson | 423/493 |
| 3,244,509 | 4/1966 | Nowak et al. | 423/149 |
| 4,055,621 | 10/1977 | Okudaira | 423/148 |
| 4,060,584 | 11/1977 | Hartmann | 423/149 |
| 4,140,746 | 2/1979 | Turner | 423/493 |

OTHER PUBLICATIONS

Othmer, "Halogen Affinities-A New Ordering of Metals to Accomplish Difficult Separations", *AICHE Journal,* vol. 18, No. 1, Jan. 1972, pp. 217-220.

*Primary Examiner*—Brian E. Hearn
*Attorney, Agent, or Firm*—Barry G. Magidoff

[57] ABSTRACT

The invention relates to the recovery of chlorine values as ferric chloride from iron chloride dust which is obtained as a by-product from the chlorination of a titaniferous material containing more than 5% by weight iron oxide, such as ilmenite. The method comprises heating the iron chloride dust to a temperature above 275° C. in the presence of chlorine and iron oxide and recovering the ferric chloride volatilized from the iron chloride dust together with the ferric chloride obtained from ferrous chloride present in the iron chloride dust by reaction with the chlorine and ferric chloride obtained from other metal chloride contaminants by reaction with the iron oxide.

7 Claims, No Drawings

RECOVERY OF CHLORINE VALUES

This invention relates to the recovery of chlorine values.

More particularly, this invention relates to the recovery of chlorine values as ferric chloride from iron chloride dust which is obtained as a by-product from the chlorination of a titaniferous material containing more than 5% by weight iron oxide, particularly ilmenite.

U.S. Pat. No. 4,140,746 describes an improvement in a process in which a titaniferous material containing more than 5 percent by weight iron oxide is chlorinated to obtain as a by-product iron chloride, and the iron chloride is separated from the titaniferous material, the improvement comprising:

(a) partially dechlorinating the ferric chloride from oxidation step (b) plus any ferric chloride in the iron chloride separated from the titaniferous material, in the presence of a reducing agent to form ferrous chloride and a chloride compound derived from the reducing agent whose chlorine values are, either directly or after processing, suitable for recycle to the titaniferous chlorination stage, and passing the ferrous chloride on to step (b); and (b) oxidizing the ferrous chloride produced in the dechlorinating stage (a) plus any ferrous chloride in the iron chloride separated from the titaniferous material, in the presence of an oxidising agent selected from the group consisting of oxygen and oxygen-containing gases and at a temperature of between about 300° C. and 1200° C. to produce ferric chloride and ferric oxide, passing the ferric chloride on to the dechlorination step (a) and removing the ferric oxide from the system; whereby the chlorine value of the iron chloride separated from the titaniferous material is recovered as the chloride of the reducing agent, a material which directly or indirectly is suitable for recycle to the titaniferous chlorination stage.

When the chlorination process from which the iron chloride feed material is obtained as a by-product is the so-called carbo-chlorination process, the iron chloride generally contains a significant quantity of blow-over coke, together with blow-over titaniferous material. When the titaniferous material is ilmenite, the iron chloride typically contains, in addition to coke and ilmenite, the chlorides of other metals principally titanium, aluminium, magnesium, manganese zirconium, niobium, chromium and vanadium as minor contaminants.

The quantity of blow-over coke and ilmenite will depend on the reaction conditions in the carbo-chlorinator, notably the chlorine gas velocity. The quantity of the minor metal chlorides will depend on the analysis of the ore being chlorinated.

Two typical analyses of iron chloride dust derived from the carbo-chlorination of ilmenite are given below, wherein analysis A represents the case where iron chloride is produced predominantly as ferrous chloride and analysis B represents the case where iron chloride is produced predominantly as ferric chloride:

| Analysis "A" | % by weight | Analysis "B" | % by weight |
|---|---|---|---|
| $FeCl_2$ | 72.0 | $FeCl_3$ | 78.0 |
| $FeCl_3$ | 5.0 | $FeCl_2$ | 3.5 |
| $TiCl_4$ | 3.0 | $TiCl_4$ | 2.5 |
| $AlCl_3$ | 2.0 | $AlCl_3$ | 1.6 |
| $MgCl_2$ | 1.5 | $MgCl_2$ | 1.1 |
| $MnCl_2$ | 0.7 | $MnCl_2$ | 0.6 |
| $ZrCl_4$ | 0.7 | $ZrCl_4$ | 0.6 |
| $NbCl_5$ | 0.6 | $NbCl_5$ | 0.5 |
| $CrCl_3$ | 0.5 | $CrCl_3$ | 0.3 |
| $VOCl_2$ | 0.5 | $VOCl_2$ | 0.3 |
| Ilmenite | 5.0 | Ilmenite | 4.0 |
| Coke | 8.5 | Coke | 7.0 |
| | 100.0 | | 100.0 |

Although the presence of these contaminants is not necessarily a disadvantage for the process disclclosed in U.S. Pat. No. 4,140,746, they can in some circumstances create problems. For example, if the coke content of the predominantly iron chloride material is significant (as is normally the case), it can make the subsequent oxidation of ferrous chloride (as in step (b) above) much more difficult to control both in terms of temperature and oxygen-ferrous chloride balance; its presence is also likely to result in a much greater volume of inert gases from the oxidation reactor, leading to plant engineering problems downstream.

Apart from the carbon contaminant, the presence of the minor metal chlorides may also complicate the process in that, as well as contaminating the products, they will not necessarily react analogously to the ferric and ferrous chloride during the oxidation and reduction steps of the process.

The use of iron chloride dust for purposes other than that of feeding to the process described in U.S. Pat. No. 4,140,746, for example, the use of ferric chloride for water-treatment applications, is also inhibited by the presence of contaminants.

We have now devised a method for conveniently separating the iron chlorides from the blow-over coke and titaniferous material, e.g. ilmenite, which also allows for the separation of the minor metal chlorides.

Thus, the present invention provides a method for the recovery of chlorine values in the form of ferric chloride from an iron chloride dust by-produced in the chlorination of a titaniferous material containing more than 5% by weight iron oxide which method comprises subjecting the iron chloride dust contaminated with other metal chlorides to a temperature above 275° C. in the presence of a predetermined quantity of iron oxide and a predetermined quantity of chlorine such that the ferrous chloride content of the iron chloride dust reacts with the chlorine and is converted to ferric chloride and that the reactive metal chlorides present as contaminants in the iron chloride dust react with the iron oxide to produce directly or indirectly ferric chloride and oxides of the metal contaminants and volatilising and recovering the ferric chloride originally present in the iron chloride dust together with the ferric chloride obtained from the ferrous chloride and other metal chloride contaminants.

According to a first aspect, the method according to the invention comprises heating iron chloride dust starting material above a temperature of 275° C. in the presence of sufficient chlorine gas to convert the ferrous chloride content of the material to ferric chloride such that the ferric chloride content of the material is removed by volatilisation and the ferrous chloride content of the material is removed by conversion to ferric chloride and volatilisation.

The operating temperature of the chlorination reactor is preferably maintained above the boiling point of ferric chloride (about 320° C.) and below the melting point of ferrous chloride (about 677° C.). More preferably, the temperature is maintained between 350° C. and 550° C.

The separation of the iron chloride content of the starting material may be summarised as follows:

$$xFeCl_2 + x/2Cl_2 + yFeCl_3 \rightarrow (x+y)FeCl_3 \qquad (1)$$

wherein "x" stands for the molar proportion of ferrous chloride in the starting material and "y" stands for the molar proportion of ferric chloride in the starting material. It is probable that a small equilibrium quantity of chlorine will be present in the ferric chloride off-gas.

If the ferrous chloride content of the starting material is low, it is possible to dispense with the use of chlorine, although this does result in the loss of the chlorine values in the ferrous chloride.

According to a second aspect of the method according to the invention, the method comprises heating the iron chloride dust material above a temperature of 275° C. in the presence of sufficient iron oxide, preferably ferric oxide, to convert the more reactive metal chloride contaminants to ferric chloride and their respective metal oxides such that the ferric chloride product is removed by volatilisation.

If the iron oxide employed is ferric oxide, the conversion of the more reactive metal chlorides to ferric chloride is effected directly. If, however, iron oxide in a lower valency state is used, it is necessary either to convert the input iron oxide to ferric oxide by adding oxygen or a molecular oxygen-containing gas or, alternatively, to convert the iron chloride product to ferric chloride by adding chlorine, oxygen or a molecular oxygen-containing gas.

Thus, according to a second aspect, the invention comprises heating the iron chloride dust starting material to a temperature above 275° C. in the presence of sufficient iron oxide to convert the reactive metal chloride contaminants of the iron chloride dust either directly or after further reaction to form ferric chloride and their respective metal oxides and recovering by volatilisation the ferric chloride product.

Of the minor metal chlorides normally present in the iron chloride by-product from the carbo-chlorination of a titaniferous material such as ilmenite, (as, for example in Analyses "A" and "B" hereinbefore), only calcium, magnesium and manganese chlorides (which are in the solid state at preferred operating temperatures) are relatively unreactive with iron oxide at the preferred operating temperatures specified above. The conversion of the reactive minor metal chlorides generally present in iron chloride dust is summarised by equations (2)–(7) below.

$$1\tfrac{1}{2}TiCl_4 + Fe_2O_3 \rightarrow 2FeCl_3 + 1\tfrac{1}{2}TiO_2 \qquad (2)$$

$$2AlCl_3 + Fe_2O_3 \rightarrow 2FeCl_3 + Al_2O_3 \qquad (3)$$

$$1\tfrac{1}{2}ZrCl_4 + Fe_2O_3 \rightarrow 2FeCl_3 + 1\tfrac{1}{2}ZrO_2 \qquad (4)$$

$$6NbCl_5 + 5Fe_2O_3 \rightarrow 10FeCl_3 + 3Nb_2O_5 \qquad (5)$$

$$2CrCl_3 + Fe_2O_3 \rightarrow 2FeCl_3 + Cr_2O_3 \qquad (6)$$

$$4VOCl_3 + 2Fe_2O_3 \rightarrow 4FeCl_3 + 2V_2O_5 \qquad (7)$$

It is preferred to carry out the removal of these chlorides by reaction with iron oxide in accordance with reaction (2) to (7) which is preferably carried out in the same reactor as the removal of coke and titaniferous material in accordance with reaction (1), although this is not essential.

It is preferred to use a fluidised bed reactor operating on a continuous basis. In this case, the contaminated iron chloride starting material is fed continuously to a bed composed mostly of coke, ilmenite, magnesium and manganese chlorides (plus optionally an inert solid). Ferric chloride, formed in accordance with reactions (1) and also in accordance with reactions (2) to (7), is continuously volatilised from the reactor, while a proportion of the solid bed material is continuously removed, e.g. as a bed overflow.

We have found that if the iron chloride content of the starting material is predominantly ferrous chloride, the fluidising gas can be chlorine alone, but if ferric chloride predominates in the starting material then an inert carrier gas is also necessary.

It is normally desirable, to add more than the stoichiometric requirement of iron oxide (as set out in equations (2) to (7) to the contaminated iron chloride starting material although the iron oxide content of the blow-over ilmenite may also act as a source of iron oxide values for reactions (2) to (7).

Optionally, in order to increase the conversion of the minor metal chloride to ferric chloride, the gaseous product from the fluidised bed reactor described above may be passed to a second fluidised bed reactor into which is fed a stoichiometric excess of ferric oxide, with the temperature preferably maintained between 350° C. and 550° C.

If the iron chloride starting material and the fluidising gas are introduced to the process summarised in equations (1) to (7) at ambient temperature, it is necessary to supply heat to the reactor in order to keep within the preferred temperature range. This is preferably done in such a way that the ferric chloride off gas is not significantly diluted, e.g. by combustion gases, if the method according to the present invention is a pretreatment for the process described in U.K. Pat. No. 4,140,746. One such method would be to heat a part of the bed overflow and recycle it to the reactor as a source of heat. Alternatively inert solids could be used as a means of introducing heat to the reactor, in which case it is preferable that their physical properties allow an easy separation, e.g. by screening, from the rest of the bed overflow.

Another method of providing the reaction heat is to combust sufficient of the coke content of the iron chloride dust thereby providing the required heat by the reaction between carbon and oxygen or a molecular oxygen-containing gas. Carbon can be converted substantially to carbon dioxide at the upper part of the most preferred temperature range, but a small equilibrium content of carbon monoxide will also be present. If the off gases from the reactor are to be routed to the chlorine recovery process described in U.S. Pat. No. 4,140,746, the presence of carbon monoxide in the ferric chloride could cause problems in the reduction stage (a) in that phosgene may be produced from the reaction of carbon monoxide and sulphur chloride. Thus, if the reaction heat for the method according to the invention is to be provided by combusting some of the carbon present in the iron chloride dust, it is preferred to route the off gases to the oxidation reaction, stage (b), in which residual carbon monoxide would be converted to carbon dioxide, instead of passing the off gases directly to the reduction reaction stage (a).

The ferric chloride off gas after removing any entrained solid particles is then available for processing, for example, in accordance with U.S. Pat. No. 4,140,746, and it enters the process at stage (a) where it is treated as the by-product from the chlorination of a titaniferous material. Alternatively, the ferric chloride may be used for other industrial purposes, e.g. water treatment. In either case, the method according to this invention provides for recovery of the chlorine values in the iron chloride dust starting material as gaseous ferric chloride which is substantially free of coke, ilmenite and minor metal chlorides, the latter being left behind in the reaction bed or in the dust-collection system or being converted to ferric chloride.

The bed overflow, after removing any inert solids used as a means of supplying heat to the reactor, consists mainly of carbon, ilmenite, magnesium and magnesium chlorides. After removing the chlorides by leaching, the residue, which contains significant carbon values, may be used as a source of heat both for the process which is the subject of this invention and for the process described in U.S. Pat. No. 4,140,746.

The invention is further illustrated by the following example:

EXAMPLE

The reaction was carried out in a continuously-operated fluidised bed reactor of 100 mm internal diameter. The reactor tube was set in an electrically powered furnace. The bed was made up of coke, ilmenite, magnesium chloride and manganese chloride derived from earlier processing of iron chloride dust by-produced in the carbo-chlorination of ilmenite. The bed height was 200 mm. The bed was fluidised with nitrogen until the bed temperature stabilised at 500° C.

The reaction was initiated by feeding 100 grams per minute iron chloride dust with an analysis similar to analysis "A" except that $TiCl_4$ had been removed by prior volatisation. This was done to improve the ease of transfering the iron chloride dust to the reactor storage hopper (which is a problem readily soluble on an industrial scale). $TiCl_4$ was instead fed to the reaction bed in appropriate stoichiometric proportion as a gas. In addition to the 100 grams per minute iron chloride dust, twice the stoichiometric ferric oxide required in terms of the content of $TiCl_4$, $AlCl_3$, $ZrCl_4$, $NbCl_5$, $CrCl_3$ and $VOCl_2$ was introduced to the reaction bed with the iron chloride dust. Simultaneously, 12.6 liters per minute chlorine were introduced to the bed.

After allowing time for conditions to stabilise, a sample of off-gases was taken from a point immediately after the furnace exit and was analysed for ferric chloride, chlorine, $TiCl_4$, $AlCl_3$, $ZrCl_4$, $NbCl_5$, $CrCl_3$ and $VOCl_2$. It was found that the more reactive minor metal chlorides had been substantially converted to ferric chloride, judging by their low levels in the off-gases. The molar ratio of ferric chloride to chlorine was 100:1.

After stopping the gaseous and solid inputs to the reaction bed, the bed was sampled and found to contain ilmenite, coke, magnesium and manganese chlorides as before, together approximately 1½% w/w ferrous chloride.

We claim:
1. A method for the recovery of chlorine values in the form of ferric chloride from an iron chloride dust by-produced in the chlorination of a titaniferous material containing more than 5% by weight iron oxide which method comprises the steps of:
   (a) subjecting the iron chloride dust contaminated with other metal chlorides to a temperature above about 275° C. and below the melting point of ferrous chloride, in the presence of a predetermined quantity of chlorine and a predetermined quantity of iron oxide such that the ferrous chloride content of the iron chloride dust reacts with the chlorine and is converted to ferric chloride and that the reactive metal chlorides present as contaminants in the iron chloride dust react with the iron oxide to produce directly or indirectly ferric chloride and oxides of the metal contaminants; and
   (b) volatilising and recovering the ferric chloride originally present in the iron chloride dust together with the ferric chloride obtained from the ferrous chloride and other metal chloride contaminants.

2. The method according to claim 1, wherein the iron oxide is ferric oxide and wherein the metal chlorides present as contaminants react with the ferric oxide directly to produce ferric chloride.

3. The method according to claim 1, wherein the metal chlorides present as contaminants are selected from the group consisting of the chlorides of titanium, aluminium, zirconium, niobium, chromium and vanadium and mixtures thereof.

4. The method according to claim 1, wherein the iron chloride dust is subjected to a temperature between the boiling point of ferric chloride and the melting point of ferrous chloride.

5. The method according to claim 4, wherein the temperature range is between about 350° C. and 550° C.

6. A modification of the method according to claim 1, wherein the iron chloride dust contains a low concentration of ferrous chloride and wherein the iron chloride dust is subjected to said temperature in the absence of added chlorine.

7. The method according to claim 1, which further comprises the steps of:
   (c) subjecting the resulting ferric chloride to partial dechlorination in the presence of a reducing agent to form ferrous chloride and a chloride compound derived from the reducing agent;
   (d) subjecting the resulting ferrous chloride to oxidation at a temperature between about 300° C. and 1200° C. to produce ferric chloride and ferric oxide and
   (e) recycling the ferric chloride to the partial dechlorination step, whereby the chlorine value of the ferric chloride is recovered as the chloride of the reducing agent.

* * * * *